United States Patent

Sarullo

(10) Patent No.: US 8,106,541 B1
(45) Date of Patent: Jan. 31, 2012

(54) OUTLET POWER STRIP WITH REMOTE CONTROL

(76) Inventor: Frank Sarullo, Royal Palm Beach, FL (US)

(*) Notice: Subject to any disclaimer, the term of this patent is extended or adjusted under 35 U.S.C. 154(b) by 190 days.

(21) Appl. No.: 12/583,420

(22) Filed: Aug. 20, 2009

Related U.S. Application Data

(60) Provisional application No. 61/189,458, filed on Aug. 20, 2008.

(51) Int. Cl.
- H01H 3/00 (2006.01)
- H01H 9/54 (2006.01)
- H01H 33/59 (2006.01)
- H01H 47/00 (2006.01)
- H01H 85/46 (2006.01)

(52) U.S. Cl. .......................................... 307/139; 307/39
(58) Field of Classification Search .................... 307/11, 307/38–39, 115–116, 139
See application file for complete search history.

(56) References Cited

U.S. PATENT DOCUMENTS

| | | | |
|---|---|---|---|
| D304,324 S | 10/1989 | Lovett et al. | |
| 5,270,576 A | 12/1993 | Kahle | |
| 5,379,341 A | 1/1995 | Wan | |
| 5,506,573 A | 4/1996 | Ewing et al. | |
| D411,169 S | 6/1999 | West | |
| 6,410,994 B1 | 6/2002 | Jones et al. | |
| 6,509,655 B1 | 1/2003 | Wang | |
| 6,586,849 B2 | 7/2003 | Tarr | |
| 6,666,712 B1 | 12/2003 | Kramer | |
| 2007/0262646 A1* | 11/2007 | Lee | 307/39 |
| 2008/0265677 A1* | 10/2008 | Chiang et al. | 307/38 |
| 2009/0146494 A1* | 6/2009 | Mori et al. | 307/38 |

* cited by examiner

*Primary Examiner* — Jared Fureman
*Assistant Examiner* — Carlos Amaya
(74) *Attorney, Agent, or Firm* — Montgomery Patent & Design, LLC; Robert C. Montgomery; Joseph T. Yaksich

(57) ABSTRACT

An electrical power strip with multiple outlets capable of being controlled by a wireless remote controller is herein disclosed. The handheld wireless controller is used to control the operation of the power strip via a radio frequency (RF). As such, the power strip is particularly advantageous for use under desks, behind shelves and in otherwise inaccessible locations, as the user can turn the entire power strip on and off without reaching it. Additionally, individual bypass switches are provided for each receptacle to turn it on permanently.

15 Claims, 2 Drawing Sheets

OUTLET POWER STRIP WITH REMOTE CONTROL

RELATED APPLICATIONS

The present invention was first described in and claims the benefit of U.S. Provisional Application No. 61/189,458 filed on Aug. 20, 2008, the entire disclosures of which are incorporated herein by reference.

FIELD OF THE INVENTION

The present invention relates generally electrical outlet power strips and, more particularly, to an electrical power supply strip capable of being controlled by, a wireless remote controller.

BACKGROUND OF THE INVENTION

In recent years the presence of electrical and electronic devices in our lives has proliferated. It is not uncommon to have dozens of such devices in ones home. In many cases such as with personal computer systems, entertainment systems, recharging areas, and the like, it is not uncommon to have many devices competing for one (1) electrical outlet. Additionally, many of the current household electronic devices draw electricity even when turned off while in a "standby" configuration. This can lead to wasted electricity usage and inflated electric utility bills. Increasing numbers of electric utility providers are recommending users unplug electric devices with not in use.

Many people utilize power strips to solve these problems. Power strips typically consist of a plurality of electrical receptacles wired in parallel that receive electrical plugs from various external devices which are connected to a single source of electricity though the power strip. These power strips generally provide a single switch which allows all the connected electrical devices to be simultaneously turned on and off. Some models of power strips also provide additional features, such as power indicator lights, surge protection, individual switches for each receptacle, or receiving ports for telephone cords or coaxial cable.

An example of these models can be seen U.S. Pat. No. 6,509,655, issued in the name of Wang, which describes a system including electronically-controlled power strip having a plurality of receptacles. The Wang system provides electrical receptacles that are independently controlled by an integral processing control unit.

Other devices provide specialized functions for use with particular types of electronics, as can be seen in U.S. Pat. No. 6,586,849, issued in the name of Tarr, which describes an electrical power strip for use with a computer and associated peripheral devices that allows the peripheral devices associated with the computer to be automatically turned on or off simultaneously with the computer being turned on and off.

While these devices may fulfill their respective, particular objectives, each suffers from one or more disadvantage. Most notably that the turning on and off action requires physical access to the power strip. This is not always easy when such strips are under desks, behind furniture or in the back of cabinets. This typically forces a user to access the power control switch and perhaps leave the device on thus wasting power and not utilizing the power strip to its full potential.

One solution to this is to simply move the power strip to a more accessible location, where it may be unsightly. Another attempt to solve this problem can be seen by example in U.S. Pat. No. 6,666,712, issued in the name of Kramer, which describes a remotely switched portable outlet which provides a manually actuated switch to remotely control the power supply to the portable outlet. The Kramer outlet utilizes an attached wired control switch that can be located in a more convenient location for a user. However, these solutions still limit control of the power supply to locations adjacent to the power strip and require the user to physically engage the power strip.

Additionally, ornamental designs for power strips exist, as seen by example in U.S. Pat. Nos. D 304,324, issued in the name of Lovett et al. and D 411,169, issued in the name of West. However, none of these designs are similar to the present invention.

Accordingly, there exists a need for a means by which power strips can be controlled without the requirement of physical access. The development of the present invention substantially departs from the conventional solutions and in doing so fulfills this need.

SUMMARY OF THE INVENTION

In view of the foregoing references, the inventor recognized the aforementioned inherent problems and observed that there is a need for electrical power supply strip with a means to simply and conveniently control the power supply to connected electronic devices in a remote manner and thus, the object of the present invention is to solve the aforementioned disadvantages and provide for this need.

Another object of the present invention is to provide an outlet power strip with remote control which enables a user to turn on and off all the electrical receptacles of the power strip from a remote location.

Another object of the present invention is to provide an outlet power strip with remote control that enables external electrical devices to be de-energized when not in use, thus saving electricity and providing an economic gain for the user.

Another object of the present invention is to provide an outlet power strip with remote control that provides individual bypass switches to turn particular receptacles on permanently.

Another object of the present invention is to provide an outlet power strip with remote control that provides visual and audible indication of functional operations.

Another object of the present invention is to provide an outlet power strip with remote control that enables the power strip to be located in out of sight locations and provides a means to communicate with the power strip that does not require line of sight.

To achieve the above objectives, the present invention provides an apparatus which provides a means for powering multiple external electrical devices by a hand-held wireless remote control. In a preferred embodiment the apparatus generally comprises a housing unit having a plurality of receptacles, a switch electrically connected to each receptacle respectively, a control module coupled to the receptacles and switches, and a plurality of relays that are selectively toggled between ON and REMOTE positions. A remote control is in wireless communication with the control module and provides a means to selectively control the supply of power to the apparatus.

The apparatus has a first operating mode that supplies constant power to each receptacle with the relays being at the ON and a second operating mode that remotely turns power on and off to allow a user to supply and interrupt power to the particular receptacles from a remote location with the relays being at the REMOTE position.

The apparatus also provides a speaker that provides a distinct audible tone when powered on by the remote control and a different distinct audible tone when powered off by the remote control. An ON light further provides a visual indication when the apparatus is activated via the remote control and an OFF light provides a visual indication when the apparatus is deactivated via the remote control.

The present invention provides a method of utilizing the device that allows users of power strips the ability to quickly and easily turn power strips on and off without the requirement of touching or even seeing them in a manner which is quick, easy and effective.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
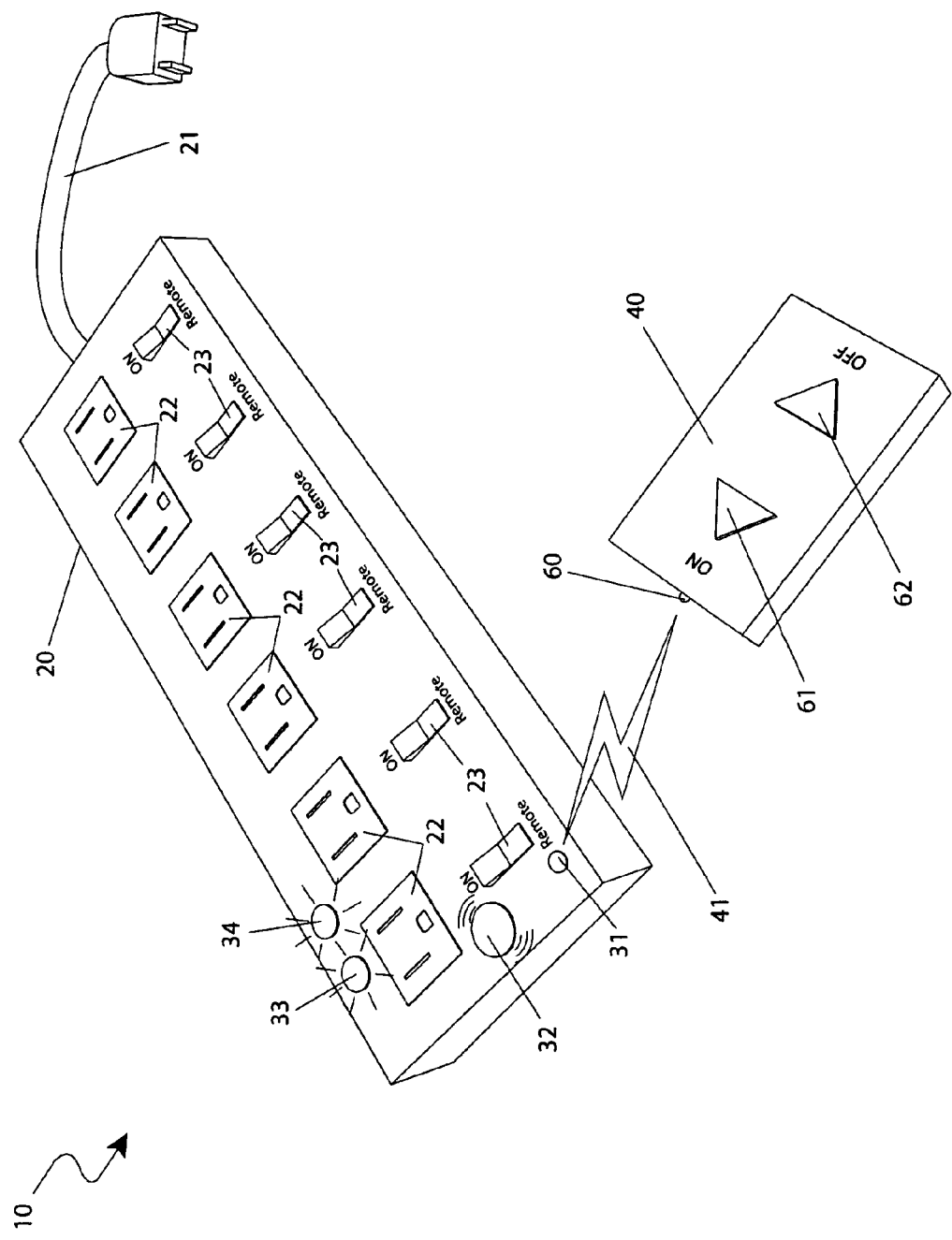
FIG. 1 is a top perspective view of an outlet power strip with remote control 10, according to a preferred embodiment of the present invention; and, FIG. 2 is an electrical block diagram of the outlet power strip with remote control 10, according to a preferred embodiment of the present invention.

DESCRIPTIVE KEY 10 outlet power strip with remote control
20 housing unit
21 power cord
22 receptacle
23 switch
30 RF control module
31 RF receiver
32 speaker
33 ON light
34 OFF light
35 sound modulator
40 hand-held remote control
41 RF signal
50 power source wiring
51 relay
60 RF transmitter
61 ON button
62 OFF button

DETAILED DESCRIPTION OF THE PREFERRED EMBODIMENT

Figure 2:
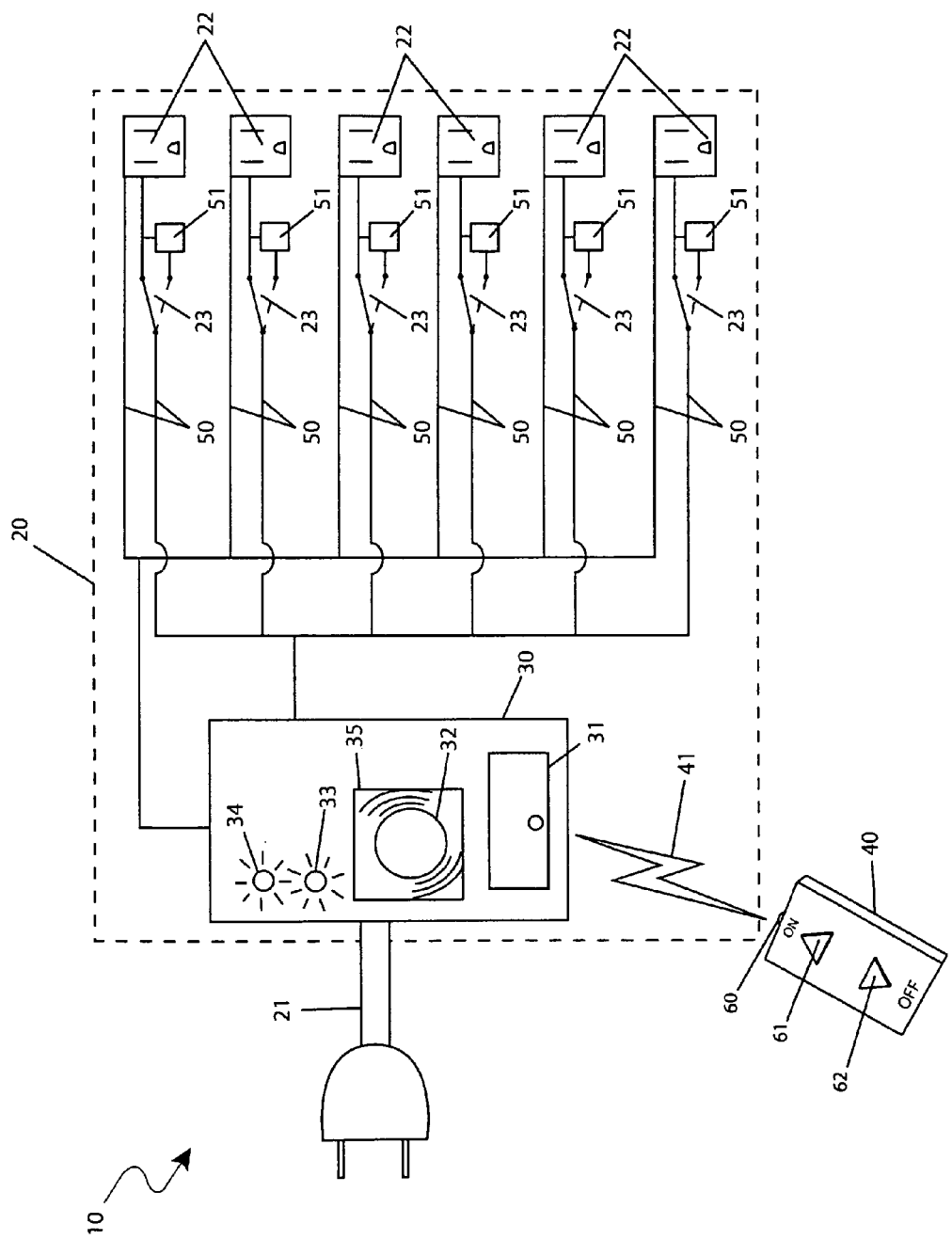

The best mode for carrying out the invention is presented in terms of its preferred embodiment, herein depicted within FIGS. 1 and 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an outlet power strip with remote control (herein described as the "apparatus") 10, which provides a means for powering multiple external electrical devices by a hand-held wireless remote control 40. The apparatus 10 comprises a plurality of receptacles 22, a plurality of switches 23, and a radio frequency (RF) control module 30. Said apparatus 10 comprises two (2) modes of operation: a first mode operating as a traditional power strip 10 supplying constant power to a plurality of devices; and, a second mode operating as a power strip 10 which can be turned on and off remotely, thus providing the advantage of allowing a user the ability to power on and off a plurality of devices without having to reach said apparatus 10 which may be located in inaccessible locations.

Referring now to FIG. 1, a top perspective view of the apparatus 10, according to the preferred embodiment of the present invention, is disclosed. The apparatus 10 comprises a rectangular housing unit 20 similar to other common power strip housing units preferably made of a plastic material and fabricated by a common plastic injection molding process or the like. Said apparatus 10 also comprises a plurality of receptacles 22 that which supply power to an external electrical device. Said receptacles 22 comprise conventional trailing male electrical connectors, thereby enabling connection of corresponding female electrical connectors. Each receptacle 22 is controlled by an independent switch 23 which is comprised of a common commercially available single-pole double-throw switch located thereon a top horizontal outside surface of the housing unit 20 and corresponding thereto said associated receptacle 22.

The apparatus 10 also comprises a common piezoelectric type speaker 32 or similar commercially available miniature audio device located therealong a top horizontal external surface of the housing unit 20. Said speaker 32 provides a distinct audible tone when said apparatus 10 is powered on by a remote control 40 and a different distinct audible tone when said apparatus 10 is powered off by the remote control 40. Said speaker 32 is interconnected for a controlling means thereto an internally located sound modulator 35 therewith conventional soldering techniques, yet other connection means may be utilized without limiting the functions of the apparatus 10.

The apparatus 10 further comprises an "ON" light 33 preferably comprised of a commercially available light emitting diode (LED), yet other illuminating devices may be utilized without limiting the functions of said apparatus 10. Said "ON" light 33 provides a visual indication when the apparatus 10 is activated via the remote control 40. The apparatus 10 further comprises an "OFF" light 34 which is preferably comprised of a common commercially available LED and provides a visual indication when the apparatus 10 is deactivated via the remote control 40. Said lights 33, 34 are located thereon a top horizontal surface of the housing unit 20 adjacent to each other. Each light 33, 34 is also interconnected for a controlling means thereto an internally located sound modulator 35 therewith conventional soldering techniques, yet other connection means may be utilized without limiting the functions of the apparatus 10 (see FIG. 2).

The apparatus 10 yet further comprises a hand-held remote control 40 which comprises expected features such as, a RF transmitter 60, an "ON" button 61, and an "OFF" button 62. Said remote control 40 comprises a handheld rectangular housing, thereby providing a digit operating means for the user. An external top horizontal portion of the remote control 40 comprises the "ON" button 61 and the "OFF" button 62 which are preferably conventional pushbuttons, yet other switching devices may be utilized without limiting the functions of the apparatus 10. Said "ON" button 61 and "OFF" button 62 provides a means for the user to activate and deactivate the receptacles 22 which are positioned to the "REMOTE" position thereon the corresponding switches 23, respectively.

A top side portion of the remote control 40 comprises the conventional RF transmitter 60, thereby providing a generating and transmitting means via a RF signal 41 thereto a RF receiver 31. The apparatus 10 preferably utilizes a RF signal 41 to communicate between the remote control 40 and said apparatus 10 providing an added benefit of not requiring a line of sight communication; however, it is understood that the invention 10 may be introduced with an infrared (IR) signal and as such should not be viewed as a limiting factor on the invention 10. The RF signal 41 is a one-way signal and does not provide for duplex communication or confirmation of said received RF signal 41. Said RF signal 41 would be of a frequency modulated (FM) signal on a frequency authorized for such use; however, other methods of modulation such as amplitude modulation, single side band, digital, continuous wave and the like would work equally well, and as such, should not be interpreted as a limiting factor of the present invention 10.

Referring now to FIG. 2, an electrical block diagram of the apparatus 10, according to the preferred embodiment of the present invention, is disclosed. The apparatus 10 comprises a conventional two (2) prong power cord 21, thereby supplying AC power to a receptacle 22 via the power source wiring 50. The apparatus 10 also comprises an RF control module 30 comprising a RF receiver 31, a speaker 32, an "ON" light 33, an "OFF" light 34, and a sound modulator 35. The RF control module 30 comprises a simple logic device which controls the function of the plurality of sub-components within said RF control module 30. The sound modulator 35 provides the logic necessary to control the two (2) distinct tones from the speaker 32 when the RF control module 30 receives a RF signal 41 from the remote control 40.

The apparatus 10 also comprises a plurality of relays 51 which are comprised of common commercially available latch relay or the like. As illustrated in FIG. 2 the switch 23 has two (2) positions, the "ON" position closes the circuit to the receptacle 22 supplying constant power to any external device plugged into said receptacle 22. The "REMOTE" position opens the circuit allowing the electrical relay 51 to control the power supplied to the receptacle 22. The relay 51 is controlled by the RF control module 30 and opens and closes the electrical supply when said RF control module 30 receives a RF signal 41 from the RF transmitter 60 thereon the remote control 40.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of utilizing the apparatus 10 may be achieved by performing the following steps: acquiring the apparatus 10; determining an area where multiple external electrical devices require power; plugging the power cable 21 into a wall power outlet; plugging the power cords of a desired amount of external electrical devices into the receptacles 22; determining which electrical device requires power in a stand-by powered down mode; switching the switches 23 of those corresponding receptacles 22 that which require constant power to the "ON" position; switching the switches 23 of those corresponding receptacles 22 that which need to be powered "OFF" via the remote control 40 to the "REMOTE" position; repeating as necessary for all desired electrical devices; powering "ON" all the desired electrical devices in the "REMOTE" position via the RF signal 41 transmitted from the RF transmitter 60 thereon the remote control 40 thereto the RF receiver 31 thereon the housing unit 20; using the desired electrical devices as normal; powering "OFF" all of the desired electrical devices in the "REMOTE" position via the RF signal 41 transmitted from the RF transmitter 60 thereon the remote control 40 thereto the RF receiver 31 thereon the housing unit 20; and, benefiting from increased and improved convenience, wireless power control, and increased energy efficiency afforded a user of the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A remotely operable outlet power strip for powering multiple external electrical devices, said remotely operable outlet power strip comprising:
   a housing unit including:
      a plurality of receptacles;
      a plurality of switches electrically connected to said receptacles, each selectively toggled between an ON and REMOTE position;
      a control module electrically coupled to said receptacles and said switches; and,
      a plurality of relays selectively toggled between ON and REMOTE conditions, each with one of said plurality of switches switched to said ON and REMOTE positions, respectively;
   a remote control in wireless communication with said control module; and,
   a power cord electrically coupled to said control module and thereby supplying power to said receptacles;
   wherein said REMOTE condition activates said wireless communication between said remote control and said control module.

2. The remotely operable outlet power strip of claim 1, wherein said remotely operable outlet power strip has a first operating mode that supplies constant power to said receptacles, said relays being in said ON condition when said remotely operable outlet power strip is at said first operating mode;
   wherein said remotely operable outlet power strip has a second operating mode that remotely turns power on and off to thereby allow a user to supply and interrupt power to said receptacles from a remote location, said relays being in said REMOTE condition when said remotely operable outlet power strip is at said second operating mode.

3. The remotely operable outlet power strip of claim 1, wherein said control module further comprises: a speaker situated on a top horizontal outside surface of said housing unit, said speaker providing a first distinct audible tone when said remotely operable outlet power strip is powered on by said remote control and further provides a second distinct audible tone when said remotely operable outlet power strip is powered off by said remote control.

4. The remotely operable outlet power strip of claim 3, wherein said control module further comprises:
 an ON light including a first light emitting diode providing a visual indication when said remotely operable outlet power strip is activated via said remote control; and,
 an OFF light including a second light emitting diode providing a visual indication when said remotely operable outlet power strip is deactivated via said remote control;
 wherein said first and second light emitting diodes are located on said top horizontal surface of said housing unit.

5. The remotely operable outlet power strip of claim 1, wherein said remote control comprises: an ON button and an OFF button for activating and deactivating said receptacles when said relays are at said REMOTE condition.

6. The remotely operable outlet power strip of claim 4, wherein said remote control generates and transmits a one-way RF signal.

7. The remotely operable outlet power strip of claim 6, wherein said control module further comprises: a sound modulator for controlling said first and second distinct tones from said speaker when said control module receives said RF signal from said remote control.

8. A remotely operable outlet power strip for powering multiple external electrical devices, said remotely operable outlet power strip comprising:
 a housing unit including:
  a plurality of receptacles;
  a plurality of switches electrically connected to said receptacles, each selectively toggled between an ON and REMOTE position;
 a control module electrically coupled to said receptacles and said switches, said control module being situated inside said housing unit; and,
 a plurality of relays selectively toggled between ON and REMOTE conditions, each with one of said plurality of switches switched to said ON and REMOTE positions, respectively;
 a remote control in wireless communication with said control module; and,
 a power cord electrically coupled to said control module and thereby supplying power to said receptacles;
 wherein said REMOTE condition activates said wireless communication between said remote control and said control module.

9. The remotely operable outlet power strip of claim 8, wherein said remotely operable outlet power strip has a first operating mode that supplies constant power to said receptacles, said relays being in said ON condition when said remotely operable outlet power strip is at said first operating mode;
 wherein said remotely operable outlet power strip has a second operating mode that remotely turns power on and off to thereby allow a user to supply and interrupt power to said receptacles from a remote location, said relays being in said REMOTE condition when said remotely operable outlet power strip is at said second operating mode.

10. The remotely operable outlet power strip of claim 8, wherein said control module further comprises: a speaker situated on a top horizontal outside surface of said housing unit, said speaker providing a first distinct audible tone when said remotely operable outlet power strip is powered on by said remote control and further provides a second distinct audible tone when said remotely operable outlet power strip is powered off by said remote control.

11. The remotely operable outlet power strip of claim 10, wherein said control module further comprises:
 an ON light including a first light emitting diode providing a visual indication when said remotely operable outlet power strip is activated via said remote control; and
 an OFF light including a second light emitting diode providing a visual indication when said remotely operable outlet power strip is deactivated via said remote control;
 wherein said first and second light emitting diodes are located on said top horizontal surface of said housing unit.

12. The remotely operable outlet power strip of claim 9, wherein said remote control comprises: an ON button and an OFF button for activating and deactivating said receptacles when said relays are at said REMOTE condition.

13. The remotely operable outlet power strip of claim 10, wherein said remote control generates and transmits a one-way RF signal.

14. The remotely operable outlet power strip of claim 13, wherein said control module further comprises: a sound modulator for controlling said first and second distinct tones from said speaker when said control module receives said RF signal from said remote control.

15. A method of utilizing a remotely operable outlet power strip for powering multiple external electrical devices, said remotely operable outlet power strip including a housing unit including a plurality of receptacles, a plurality of switches electrically connected to said receptacles, each selectively toggled between an ON and REMOTE position, a control module electrically coupled to said receptacles and said switches, said control module being situated inside said housing unit, and a plurality of relays selectively toggled between ON and REMOTE conditions, each with one of said plurality of switches switched to said ON and REMOTE positions, respectively; a remote control in wireless communication with said control module; and a power cord electrically coupled to said control module and thereby supplying power to said receptacles,
 wherein said REMOTE condition activates said wireless communication between said remote control and said control module; said method comprising the steps of:
 plugging said power cable into a wall power outlet;
 plugging power cords of said external electrical devices into said receptacles respectively;
 switching said switches of corresponding ones of said receptacles which require constant power to the ON position; and,
 switching said switches of corresponding ones of said receptacles which need to be powered OFF to said REMOTE position.

* * * * *